Jan. 1, 1952         J. W. FLUDE         2,580,537
ENCLOSED KITE-TYPE DETECTOR CARRIER
Original Filed March 7, 1942
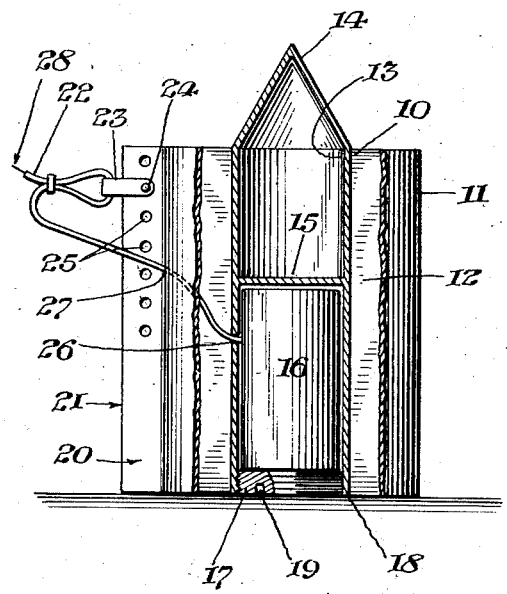
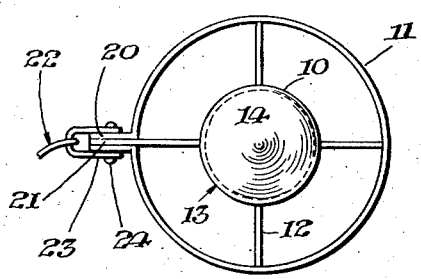
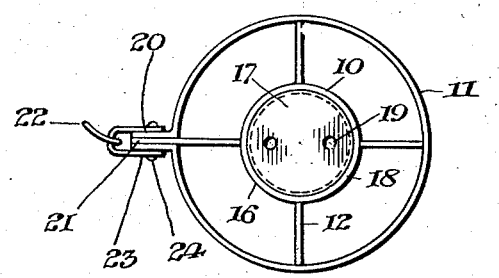
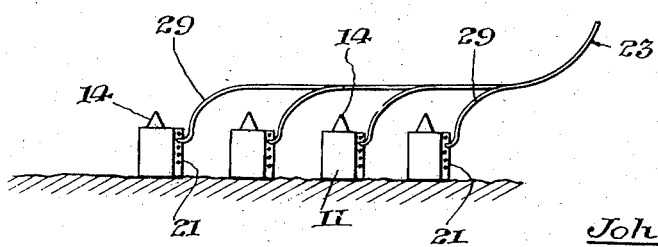
INVENTOR.
John W. Flude
BY Cousins & Cousins
ATTORNEYS.

Patented Jan. 1, 1952

2,580,537

UNITED STATES PATENT OFFICE 2,580,537

ENCLOSED KITE-TYPE DETECTOR CARRIER

John W. Flude, Houston, Tex.

Original applications September 16, 1939, Serial No. 295,198, and March 7, 1942, Serial No. 433,731. Divided and this application June 4, 1947, Serial No. 752,471

3 Claims. (Cl. 114—0.5)

This invention relates to detector carriers for seismographic exploration and is a divisional of U. S. Patent No. 2,283,200, dated May 19, 1942, a divisional of United States Patent No. 2,423,591, dated July 8, 1947.

The invention is directed to combined electrical and mechanical devices for making geophysical investigations in locating and defining subterranean, underwater deposits.

Seismographic exploration of sub-surface formations, particularly such as contain oil, salt or sulphur, is well known. It is usually accomplished by an electrical seismograph, comprising a detector or "Geophone" capable of detecting the slightest earth vibrations.

The detector is commonly of the coil and magnet type, connected to an amplifier of the electric current generated by the detector, and a galvanometer type of oscillograph, so arranged that a light beam, reflected by a mirror on the galvanometer, records ground waves on a moving strip of photo-sensitive material.

When the seismograph is placed in a predetermined position, with respect to one or more "shot points," it records the amplitude and frequency of the reflected and refracted waves resulting from a shock created at such points.

Analysis of the developed photographic strip enables a geophysicist to determine, with fair accuracy, the nature of the sub-surface formations at various levels between the detectors and shot points.

The principal object of the invention is to provide apparatus to carry into effect the steps of the method disclosed in Patent No. 2,283,200, dated May 19, 1942.

A specific object of the invention is the provision of a towing cable having a number of taps so that a plurality of detectors may be towed and used in predetermined spaced relationship.

A further specific object of the invention is to provide a holder for a detector so constructed that the detector may be readily lowered or raised at a predetermined location.

A further object is the provision of a detector holder which will rise substantially in a vertical path from the bottom for use where the bottom may be uneven or rocky.

These and other objects are accomplished by the novel construction, combination and arrangement of parts hereinafter described and shown in the accompanying drawings, constituting a material component of this disclosure, and in which:

Figure 1 is a side view of a complete embodiment of this invention, partially broken away to show the construction.

Figure 2 is a top plan view of the carrier shown in Figure 1.

Figure 3 is a bottom plan view of the carrier.

Figure 4 is a side elevation of a plurality of detector carriers, according to this invention incorporated into a tow.

Referring to the drawings, and particularly to Figures 1 and 2, 10 and 11 indicate two hollow concentric cylinders joined by a plurality of radially extending fins or blades 12. The upper portion of the inner cylinder 10 is constructed in the form of an airtight buoyant chamber 13 by sealing the upper end with a conical member 14 and securing a disk-like diaphragm 15 somewhat above the central portion of the cylinder. A lower chamber 16 is thus provided below the diaphragm 15 in the cylinder 10. A detector or other seismic instrument (not shown) may be housed within the chamber 16. A threaded plug 17, adapted to be screwed into the internally threaded base 18 of the cylinder 10, seals the bottom of the lower chamber 16. The plug 17 retains the seismic instrument in place and is provided with suitable recesses 19 so that it may be removed quickly by means of a spanner wrench or similar tool. The plug 17 may also be weighted to insure the correct positioning of the carrier upon the ocean bottom.

One of the fins 12 is extended beyond the periphery of the outer cylinder 11, and portions 20 of the outer cylinder 11 are bent outwardly to extend parallel in contact therewith. This construction provides a reinforced external fin 21 to which a towing cable 22 may be attached as through a connection 23 secured to the carrier by pins 24. The pins 24 are thrust through one of a plurality of apertures 25 provided in the said fin 21.

An aperture 26 is provided in the inner cylinder 10 and a second aperture 27 is formed in the outer cylinder 11, so that the detector, or seismic instrument within the carrier chamber 16 may be connected to the apparatus aboard the towing vessel (not shown), as by conductors 28 disposed within the towing cable.

The above described carrying device is of very sturdy construction and is adapted to be towed through the water without excessive resistance. When the towing cable 22 is secured by clevis arrangement, such as that shown at 23, to one of the apertures 25 in the outwardly extending fin 21, the device assumes an oblique position in the water, the specific angle of obliquity being determined by the particular aperture to which the cable 22 is connected.

When the towing cable 22 is slacked off, the device settles to the bottom in the approximate position illustrated in Figure 4, the buoyancy of the chamber 13 and the weight of the detector in the chamber 16, together with the weight of the plug 17 assisting in this respect.

As the device settles to the bottom, the movement of water through the space between the respective cylinders 10, 11 and along the faces of the fins 12, further insures the downward movement of the device in a substantially upright position.

When tension is again placed on the towing cables 22, the guiding surfaces again come into play and the device rises substantially vertically from its position on the bottom, gradually turning in the direction in which it is towed, until it assumes its normal oblique towing position.

Under certain conditions it may be desirable to connect the towing cable to the apex of the cone 14 in order to insure movement of the carrier through the water in the direction of its longitudinal axis.

Figure 4 illustrates the manner in which a plurality of these enclosed kite type detector carriers may be incorporated into a tow by securing them to the ends of taps 29 leading from the main towing cable 22. In this way, a plurality of readings may be taken at the same time.

Having thus fully described the invention, what is claimed as new and desired to be secured by Letters Patent of the United States, is:

1. An apparatus for towing an instrument through the water comprising, concentric cylindrical casings, a conical member overlying one end of the innermost cylinder, a plug insertable within the end of the innermost cylinder opposite the conical member, a disc-like member transversely carried within the innermost casing intermediate the ends thereof, said conical member, plug and disc being adapted to divide the interior of the innermost casing so as to form a watertight buoyancy chamber between the conical member and the disc and a watertight instrument-holding chamber between the disc and plug, a plurality of fins extending radially from said innermost casing and connecting the concentric casings together and tie means comprising pierced outwardly flared flanges on the outer casing and an extended fin therebetween, said fin being adapted to be secured to the end of a towing line.

2. An apparatus for towing an instrument through the water comprising, concentric cylindrical casings, a conical member overlying one end of the innermost cylinder, ballast means comprising a plug insertable within the end of the innermost cylinder opposite the conical member, a disc-like member transversely carried within the innermost casing intermediate the ends thereof, said conical member, plug and disc being adapted to divide the interior of the innermost casing so as to form a watertight buoyancy chamber between the conical member and the disc and a watertight instrument-holding chamber between the disc and plug wherein the plug closes the instrument chamber and constitutes ballast whereby the buoyancy chamber and instrument chamber assume a generally upright position upon cessation of towing, a plurality of fins extending radially from said innermost casing and connecting the concentric casings together and tie means comprising pierced outwardly flared flanges on the outer casing and an extended fin therebetween, said fin being adapted to be secured to the end of a towing line.

3. An apparatus for towing an instrument through the water comprising, concentric cylindrical casings, a conical member overlying one end of the innermost cylinder, a plug insertable within the end of the innermost cylinder opposite the conical member, a disc-like member transversely carried within the innermost casing intermediate the ends thereof, said conical member, plug and disc being adapted to divide the interior of the innermost casing so as to form a watertight buoyancy chamber between the conical member and the disc and a watertight instrument-holding chamber between the disc and plug, a plurality of fins extending radially from said innermost casing and connecting the concentric casings together, one of said fins extending through said outer casing and having means thereon for attaching a towing line to said extending fin.

JOHN W. FLUDE.

REFERENCES CITED

The following references are of record in the file of this patent:

UNITED STATES PATENTS

| Number | Name | Date |
| --- | --- | --- |
| 1,315,122 | Henslee | Sept. 2, 1919 |
| 1,343,969 | Hampton | June 22, 1920 |